UNITED STATES PATENT OFFICE.

ANDREW T. LANE, OF ST. LOUIS, MISSOURI, ASSIGNOR TO THE PYORR-LARIS COMPANY, OF ST. LOUIS, MISSOURI, A CORPORATION OF MISSOURI.

COMPOSITION OF MATTER.

1,377,780.   Specification of Letters Patent.   Patented May 10, 1921.

No Drawing.   Application filed October 14, 1920. Serial No. 416,830.

*To all whom it may concern:*

Be it known that I, ANDREW T. LANE, a citizen of the United States, residing at St. Louis, Missouri, have invented a new and useful Composition of Matter, of which the following is a specification.

This invention relates to a composition of matter.

The invention relates specially to a preparation for use as a tooth paste and which possesses medicinal qualities for the relief of such ailments as pyorrhea, etc.

In making the preparation I have followed the procedure set forth satisfactorily. To three and one-half gallons of water are added six pounds of soap chips. The soap is characterized by the fact that it is made of pure vegetable oil and is free from animal fats and does not contain free alkali. The water containing the soap chips is boiled until the soap chips are thoroughly dissolved. I have found that boiling for between ten and fifteen minutes accomplishes the desired result. During the boiling the water containing the soap chips is stirred and while boiling I add thereto a mixture comprising fourteen ounces of pure borax dissolved in one-half gallon of water. The mixture of the above ingredients is boiled and stirred for about ten minutes and while being boiled and stirred one quart of essence of soap tree bark, *Quillaja saponaria*, is added. After the adding of this essence the mixture is boiled for about eleven minutes, and while boiling two ounces of 28 per cent. ammonia is added to the mixture.

The mixture is thoroughly stirred and then poured through a strainer. A strainer which I have used satisfactorily consists of four thicknesses of fine cheese cloth.

After being strained the mixture is allowed to stand for about twenty minutes and is skimmed, and then allowed to stand for about ten minutes additional and again skimmed to remove from the mixture all floating matter. After being thoroughly cooled a quantity of flavoring substance is added to the mixture in order to give a pleasing flavor and aroma thereto. I have found that peppermint oil serves this purpose satisfactorily and to the above-mentioned ingredients may be added about eighty minims to a pint of the mixture.

The essence of soap tree bark mentioned may be produced by boiling for one hour three gallons of water containing one pound of soap tree bark, and filtering the substance through a strainer or the like, producing about two gallons of the essence.

The preparation herein described has been used with complete satisfaction as a tooth paste, and also has been found highly beneficial for the treatment of pyorrhea, etc. It thoroughly cleanses the teeth and gums and appears to function as a germicide as well as a cleansing and healing substance.

I am aware that the specific procedure mentioned may be varied in equivalent limits without departure from the invention, and I do not restrict myself in unessential particulars.

I claim:

1. A preparation of the character described, comprising a mixture of water, soap, borax, and essence of soap tree bark.

2. A preparation of the character described, comprising a mixture of water, soap, borax, and essence of soap tree bark, and a quantity of ammonia.

3. A preparation of the character described, comprising a mixture of water, soap, borax, essence of soap tree bark, a quantity of ammonia, and a flavoring substance.

4. A preparation of the character described, comprising the following ingredients in about the proportions stated: water about three and one-half gallons; six pounds of soap free from animal fat and containing no free alkali; fourteen ounces of dissolved borax; one quart of essence of soap tree bark; two ounces of ammonia; and an appropriate quantity of flavoring substance.

ANDREW T. LANE.